United States Patent
Elmer

[11] Patent Number: 5,128,649
[45] Date of Patent: Jul. 7, 1992

[54] MOTOR VEHICLE ALARM

[75] Inventor: John C. Elmer, Kloof, South Africa

[73] Assignee: Chao-Yean Chang, Taiwan, Taiwan

[21] Appl. No.: 726,709

[22] Filed: Jul. 8, 1991

[51] Int. Cl.$^5$ .............................................. B60R 25/10
[52] U.S. Cl. .................................. 340/426; 340/430; 307/10.2; 70/237; 70/226
[58] Field of Search ............... 340/426, 430; 307/10.2, 307/10.4; 180/287; 70/209, 210, 211, 212, 213, 214, 252, 253, 225, 226, 237, 238

[56] References Cited

U.S. PATENT DOCUMENTS

| | | | |
|---|---|---|---|
| 4,682,062 | 7/1987 | Weinberger | 307/10.4 |
| 5,014,529 | 5/1991 | Wu | 70/226 |
| 5,022,246 | 6/1991 | Wang | 70/209 |

FOREIGN PATENT DOCUMENTS

| | | | |
|---|---|---|---|
| 0224977 | 6/1987 | European Pat. Off. | 70/252 |
| 2710444 | 9/1978 | Fed. Rep. of Germany | 70/238 |
| 2141779 | 1/1985 | United Kingdom | 70/237 |

Primary Examiner—Jin F. Ng
Assistant Examiner—Dov Popovici
Attorney, Agent, or Firm—Bacon & Thomas

[57] ABSTRACT

A motor vehicle alarm may be locked on the steering wheel of a vehicle includes an arcuate shaped body, a locking mechanism, a control means, a detecting means, and an audible alarm. The detecting means has at least one detector to detects a presence of a person within the vehicle. The control means has a delay circuit to delay activation of the detecting means and of the audible alarm, a signal amplifier, a signal generator producing necessary coded signal, a comparator for recognition of a correct signal, for activation and deactivation of the detecting means, and for energizing the locking mechanism. The alarm may be secured on a steering wheel of a vehicle. The body has further an extending portion from one end beyond the periphery of the steering wheel to prevent a complete rotation of the steering wheel.

4 Claims, 5 Drawing Sheets

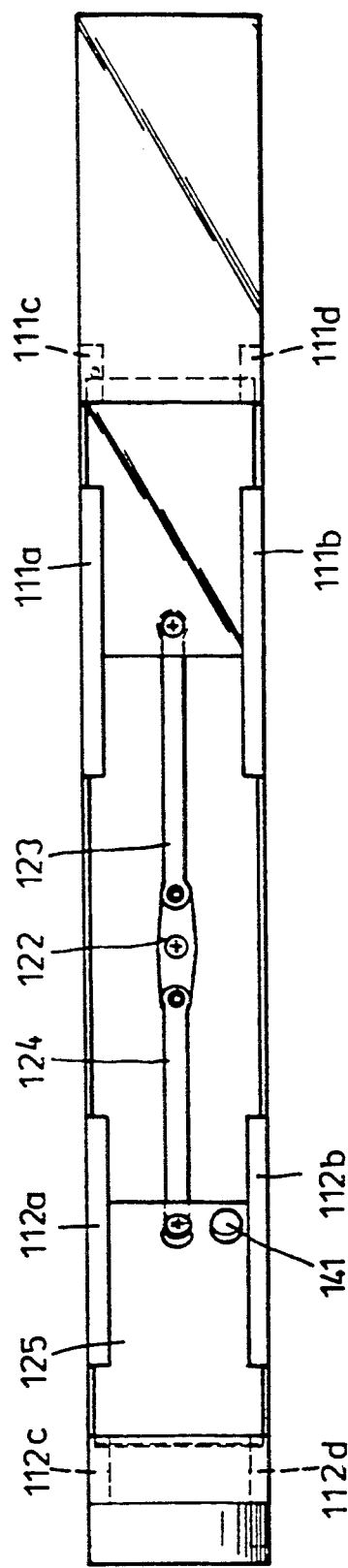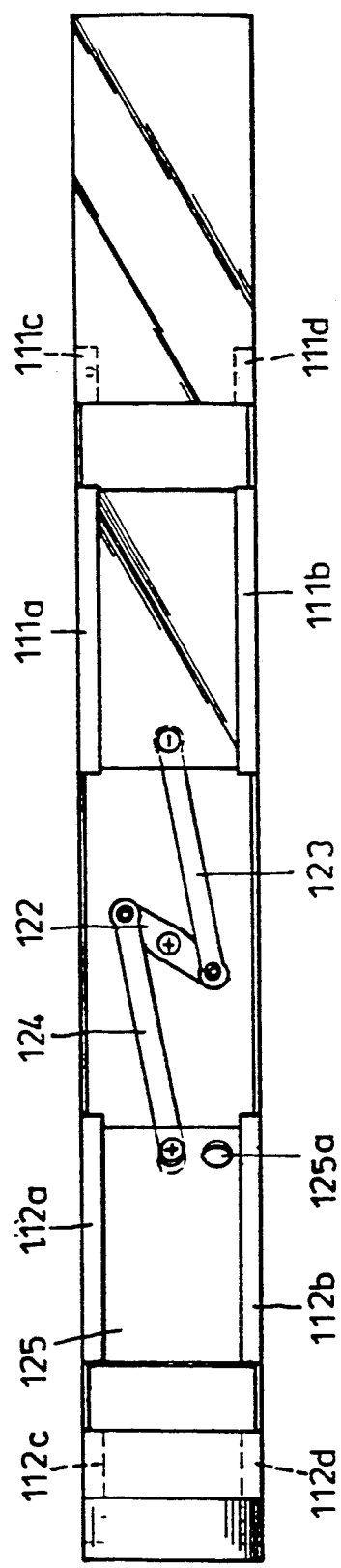
FIG. 3A
FIG. 3B

MOTOR VEHICLE ALARM

BACKGROUND OF THE INVENTION

1. Field of the Invention

The invention is in the field of a motor vehicle alarm, and more particularly, an alarm mounted on a steering wheel to detect the presence of a person. More particularly, an alarm mounted on the steering wheel of a vehicle has a portion extending outward beyond the periphery of the steering wheel to prevent complete rotation of the steering wheel.

2. State of the Art

Antitheft devices for motor vehicle are well known in the art, the most common devices being electronic alarm and steering wheel lock. The electrical alarm is installed in a vehicle and will siren when a person intends to break the car. But, such installation may be easily sabotaged by a person skilled in the art to cut off the wire.

Steering wheel lock of prior art mostly has two hook ends, each of which engaging with a portion of a steering wheel, and having a portion extending outward beyond the periphery of the steering wheel so as to prevent complete rotation of the wheel. However, the steering wheel lock appears susceptible to be overcome by physical force or manipulation.

Therefore, an improved antitheft device is provided, which is designed to possess the merits of and to eliminate both of the above-mentioned devices.

SUMMARY OF THE INVENTION

It is the primary object of the present invention to provide a motor vehicle alarm device which is secured on a steering wheel and which has an extending portion to provide the vehicle with alarm and locking protections.

It is another object of the present invention to provide a motor vehicle alarm which device, when secured on a steering wheel, automatically activates an infrared-rays detector to detect the presence of a person into the vehicle and to trigger a high pitched tone to form double pressures to theft.

It is still another object of the present invention to provide a motor vehicle alarm which includes a control circuit having a delay circuit which has a lead time for the operator to leave the vehicle after locking the steering wheel before activating the detecting means or for the driver to key in a necessary signal when entering into the vehicle before activating the audible alarm.

It is a further object of the present invention to provide an alarm device for antitheft purpose which includes a control circuit having a coded signal generator and a comparator that will release the locked condition when a correct signal is input and compared.

It is still a further object of the present invention to provide an alarm for antitheft purpose which has an enclosed housing to accommodate a power source, a control means, and a locking mechanism within the enclosed housing to protect the alarm from being illegal break through from outside.

It is still a further object of the present invention to provide a motor vehicle alarm which includes a recess of a larger space so as to adjust the lock to fit steering wheels of different sizes and is so called one size fit all.

These objects and other objects, features, aspects and advantages of the present invention will become more apparent from the following detailed description of the present invention when taken in conjunction with the accompanying drawings

BRIEF DESCRIPTION OF THE DRAWINGS

FIG. 3A is a bottom view of FIG. 1 showing the alarm in a locked condition;

FIG. 3B is a bottom view of FIG. 1 showing the alarm in an open condition;

DETAILED DESCRIPTION OF THE PREFERRED EMBODIMENT

Figure 1:
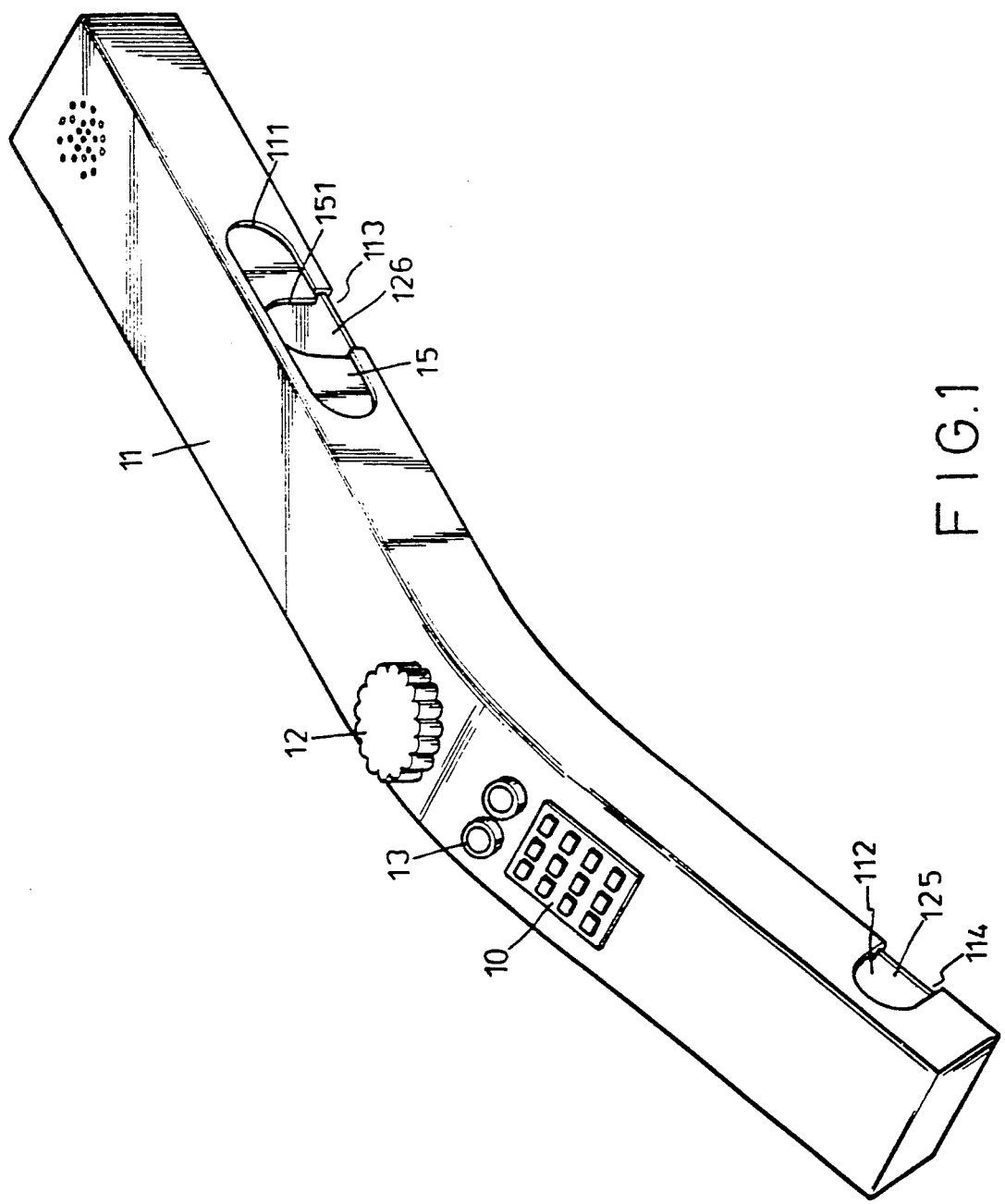
FIG. 1 is a perspective view of the present invention.

Referring to the drawings wherein the showings are for the purpose of illustrating a preferred embodiment of the invention only and not for the purpose of limiting the same, FIG. 1 shows a perspective view of a motor vehicle alarm having an arcuate contoured hollow body 11 to fit on a steering wheel having a bulge portion at center of the steering wheel. The alarm includes a locking mechanism for releasably locking the body on to a steering wheel on which it is fitted, the body incorporating a detecting means for detecting a presence of a person within the vehicle, control means for activating and deactivating the detecting means and for actuating the locking mechanism, and an audible alarm that can be triggered in response to the presence of a person being detected by the detecting means when activated.

The body member 11 includes two openings 113 and 114 at appropriate bottom portions, two recesses 111 and 112 extending upward a portion from each of the openings 113 and 114, a knob 12, at least one infrared rays detector 13 preferrably two detectors, and a key pad 10. The two openings 113 and 114 are dimensioned slightly larger than the diameter of the rim of the steering wheel to enable the rim to be inserted therein and fit in the two recesses 111 and 112. The recess 112 has the same size as of the opening 114. The recess 111 has axially formed a larger space which, upon a portion of the steering wheel is inserted therein, may be moved to adjust the locking position according to the size of the steering wheel so that the other portion of the steering wheel may be inserted into the recess 112 regardless of the size of the wheel, which means that if a steering wheel has a smaller size, the portion of the steering wheel fitted within the recess 111 may be positioned closer to the center portion of the body 11. Otherwise, the locked portion of the steering wheel within the recess 111 may be positioned closer to the outer end of the body 11. This design enables the present invention to be mounted on any steering wheel of different sizes. A U-shaped plate 15 having a recess 151 of the same size of the opening 111 is slidably mounted on the opening 111 in the body 11 being adapted to cover the exposed area of the recess 111 upon a steering wheel is inserted therein through the opening 111 and fitted into the recesses 111 and 151 so as to protect the inside of the alarm from being broken. The body 11 has an outwardly extending portion beyond the periphery of the steering wheel so as to prevent complete rotation of the steering wheel.

Figure 2:
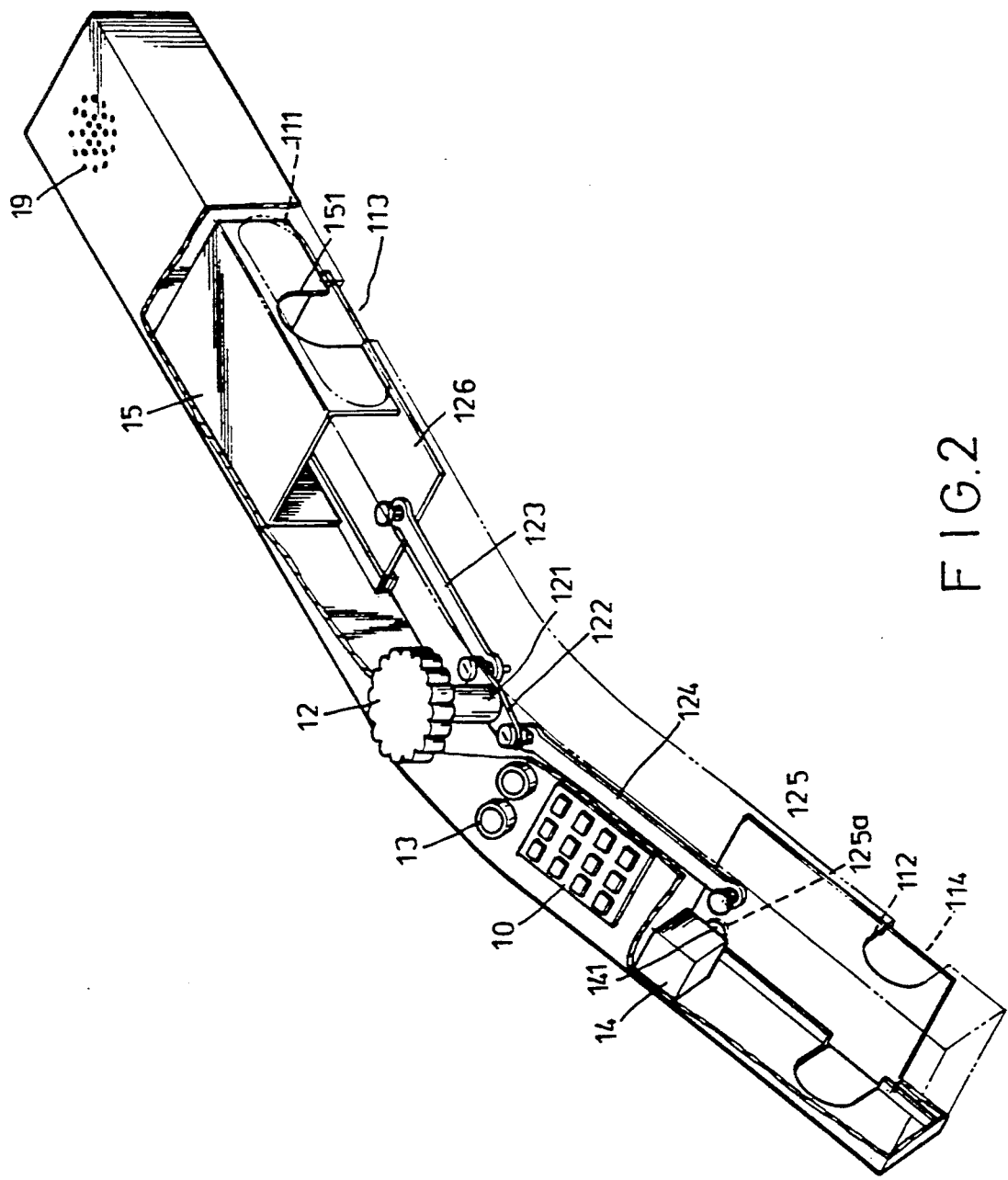
FIG. 2 is a side perspective view of FIG. 1 with the top and front sides skins peered off.

Referring to FIG. 2. The knob 12 has a shaft 121 extending downward within the body 11 and horizontally connected to a guide plate 122 at its end. Each end of the plate 122 respectively are connected to one end of a lever 123 and of a lever 124. The other end of each of the levers 123 and 124 is connected to respective two locking plates 125 and 126. Each of the locking plates 125 and 126 is slidably inserted within the bottom portion of the body 11. Two sides of the plate 126 respectively are inserted into grooves 111a, and 111b which are formed at each side of one end of the opening 113 closing to the center portion of the body 11. Two sides of the plate 125 respectively are inserted into grooves 112a, and 112b which are formed at each side of one end the opening 114 closing the center portion of the body 11. The grooves 111a, 111b, 112a, and 112b are hereinafter referred to as slide ways. Each sides of the other end of the openings 113 and 114, opposing the slide ways 111a, 111b, 112a, and 112b, are formed with stop grooves 111c, 111d, 112c, and 112d respectively. Said locking plates 125 and 126 are slidable along the slide ways 111a, 111b, 112a, and 112b and will be stopped when two plates 125 and 126 reaching the stop grooves 111c, 111d, 112c, and 112d. The two locking plates 125 and 126, at this moment, seal the openings 113 and 114. A solenoid 14 is fixedly mounted to the underside of the top portion of the body 11 facing downward with a core 141 extending downward into an aperature 125a of the locking plate 125. The core 141 is in alignment with the aperature 125a when the plate 125 is stopped by the stop grooves 112c, and 112d. The solenoid 14 is functioned as a latch of a lock mechanism of the present invention to restrain a free movement of the locking plate 125 when the core 141 is inserted into the aperature 125a and blocks the rotation of the knob 12, thus the alarm is securely locked on the steering wheel.

Referring to the FIG. 3A of the preferred embodiment. The knob 12 is turned clockwise to guide the two locking plates 125 and 126 to slide outward along the slide ways 111a, 111b, and 112a, 112b. Upon reaching the end of the stop grooves 111c, 111d, and 112c, 112d, the two plates 125 and 126 are stopped and the core 141 of the solenoid 14 snaps into the aperature 125a of the plate 125 thus, the alarm is securely locked on the steering wheel. A micro switch 17, being installed in one end of the stop groove such as 111c, is activated when the plate 126 reaches the end of the stop grooves 111c, and 111d. Accordingly, the alarm of the present invention is activated.

To release the locked condition, as shown in FIG. 3B, simply input a correct signal to energize the solenoid 14 to retract the core 141 from the aperature 125a of the plate 125 and to rotate the knob 12 counterclockwise to guide the two locking plates 125 and 126 to slide inward toward the center position and to depart from the openings 113, and 114 and the locked condition is released.

Figure 4:
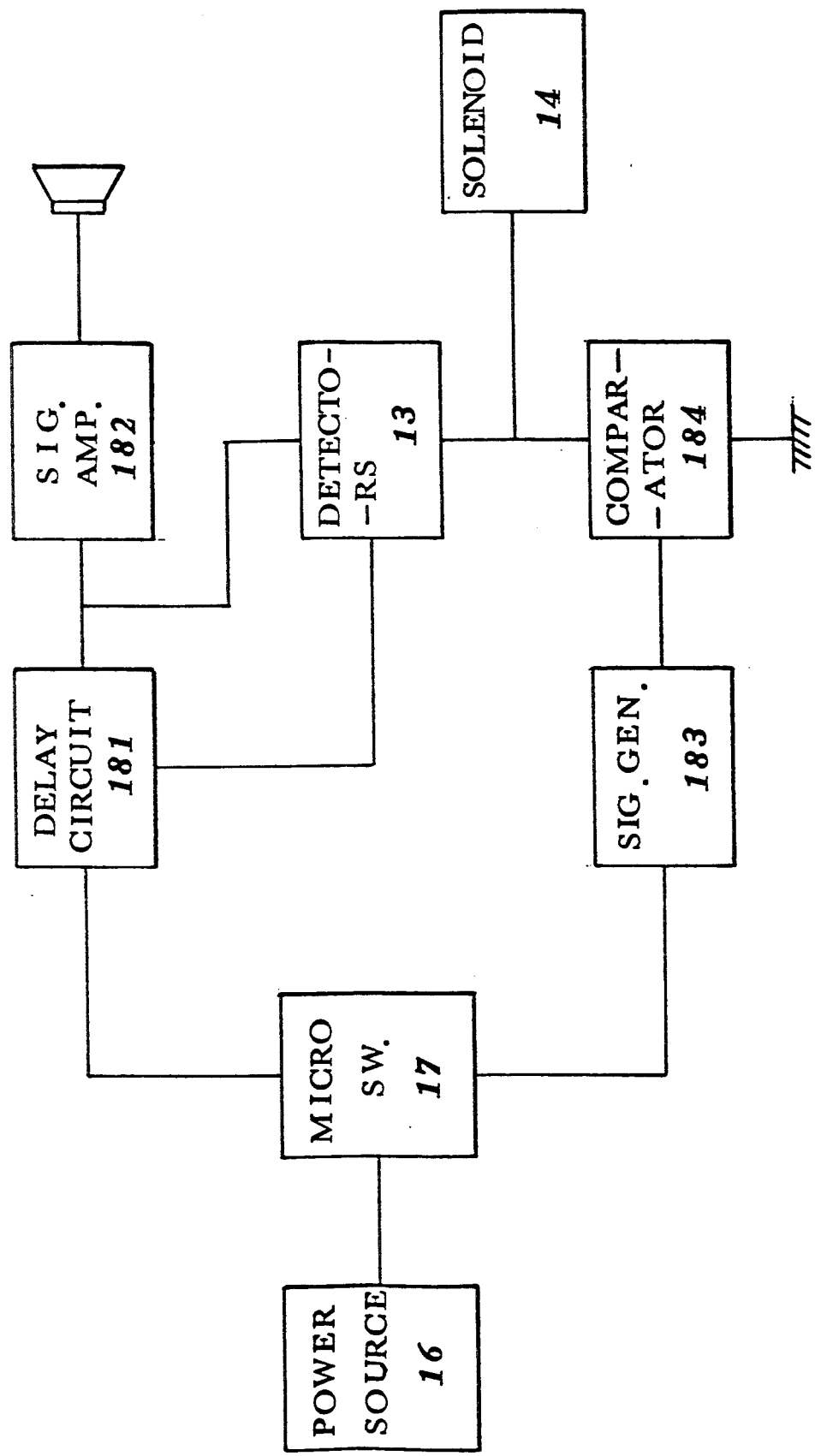
FIG. 4 is a block diagram of a control circuit, according to the present invention.

FIG. 4 is a block diagram of the control means of the present invention which includes a power source 16, a micro switch 17, a control circuit 18, a speaker 19, and two detectors 13. The power source 16 is preferably a rechargable battery charging through a vehicle battery typically by being connected to the power source via cigarette lighter of the vehicle. The control circuit 18 is oprable in response to a predetermined signal being received from the key pad 10 for deactivating the detecting means may also provide for energizing of the locking mechanism to permit its displacement into a released position in which the body 11 can be removed from the steering wheel of a vehicle and is composed of a delay circuit 181, a signal amplifier 182, a signal generator 183, and a comparator 184. The delay circuit 181 is a time delay circuit which permits the driver and the passengers within the vehicle to leave after locking the body 11 on the steering wheel of the vehicle before activating the detecting means. Upon the lead time elapsed, the detecting means is activated and the two detectors 13 begin to screen a predetermined range within the vehicle. Should the detectors 13 detect a presence of a person within the vehicle, a signal will be transmitted to the delay circuit 181. The delay circuit 181, upon receiving the signal, will permit the person a predetermined time to key in the necessary coded signal via the key pad 10 before the alarm is triggered. When a coded signal is keyed in via the key pad 10, the signal will be send to the comparator 184 to compare with a prestored signal. Should the two signals compared the same, a new signal will be generated by the comparator 184 to energize the core 141 of the solenoid switch 14 to retract from the aperature 125a and to deactivate the detectors 13 which in turn, deactivate the detecting means. On the contrary, should the keyed in signal is different from the prestored signal after comparison, the alarm will be triggered to siren in a high pitched frequency.

Figure 5:
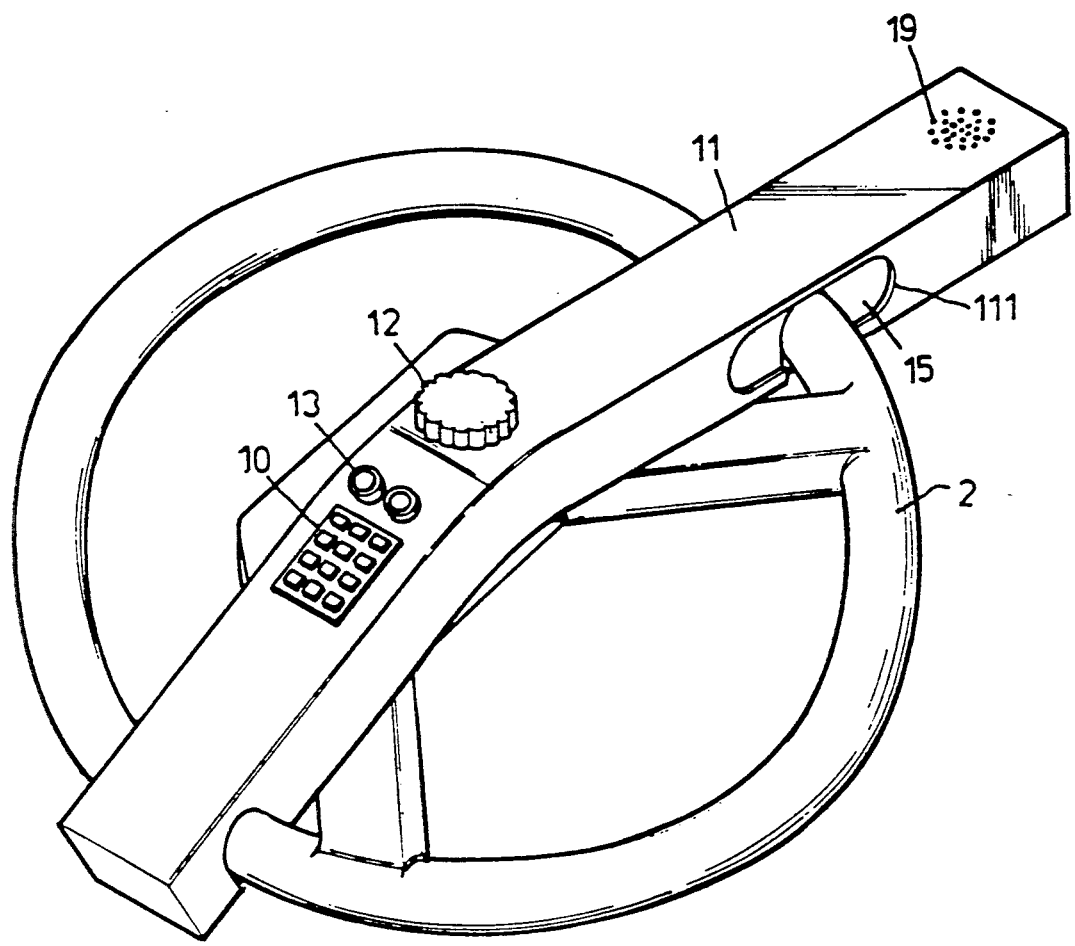
FIG. 5 is a perspective view of the present invention secured on a steering wheel.

Operation of the alarm means of the present invention is as follows: Upon the lock is placed on a steering wheel (as shown in FIG. 5) and the two locking plates 125 and 126 respectively slide into and stopped by the stop grooves 111c, 111d, 112c, and 112d, the micro switch 17 is activated. The delay circuit 181 will delay a certain period of time to permit the driver and the passengers to leave the vehicle before it triggers the detectors 13. When the lead time elapsed, the detecting means is triggered and the detectors 13 begin to screen within different regions of the vehicle. Should the detectors 13 detect a presence of a person, a signal will be transmitted through the detectors 13 to the delay circuit 181. The delay circuit 181, upon receiving such signal, will delay a certain period of time for a necessary coded signal input before it triggers the alarm. Upon receiving a coded signal from the key pad 10, the comparator 184 will compare the received signal with a prestored signal. Should the two signals are compared the same, the comparator 184 will generate a signal to retract the core 141 of the solenoid 14 from the aperature 125a. The generated signal also deactivates the detectors 13 which, in turn, deactivate the detecting means. The locking condition is, hence, released. Should the received signal is compared different from the prestored signal after comparison, the comparator 184 will bypass the received signal to ground. If the lead time elapsed and the comparator 184 did not receive a correct coded signal, the delay circuit 181 will send a signal through the signal amplifier 182 to trigger the speaker 19 to output a high pitched tone.

The comparator 184 may include a receiver to receive a signal from a remote controller to activate and deactivate the detecting means.

I claim:

1. A motor vehicle alarm mechanism to be mounted on a steering wheel of a vehicle, comprising an arcuately contoured hollow body, locking means including locking plates for releasably locking the body onto a steering wheel on which the body is to be fitted, detecting means for detecting a presence of a person within the vehicle, control means for activating and deactivating the detecting means and for causing the locking means to lock the body on said steering wheel, and an audible alarm arranged to be triggered in response to the presence of a person being detected by the detecting means when the detecting means is activated, said hollow body accommodating said locking means, said control means, said detecting means, and said audible alarm therein, said hollow body further accommodating a knob and a key pad, said control means comprising a shaft extending into said body and connected to a guide plate at one end of said shaft; two levers, one end of each of said levers being connected to respective ends of said guide plate, the second end of each of said levers being connected to respective ones of said locking plates; means defining two openings each slightly larger than the size of the rim of a steering wheel for permitting said mechanism to be fitted over the steering wheel; guide means for slidably guiding said locking plates to open and close said openings in response to turning of said knob; means for limiting the extent of travel of said locking plates in said guide means; a solenoid fixedly mounted within the body and having a core extending towards an aperture in one of the locking plates, said aperture being in axial alignment with said core of said solenoid when said one of said locking plates is at a locking position; and a control circuit including means for deactivating said detecting means, and for unlocking said locking plates by withdrawing said core from said aperture, in response to entry of a code in said key pad.

2. A motor vehicle alarm mechanism as claimed in claim 1, wherein said control circuit further comprises a delay circuit means for receiving a signal from said detector means upon detection of the presence of a person, and delaying said signal for a sufficient time to permit a coded input signal to be entered by said key pad; means for storing a coded reference signal, means for comparing the coded reference signal with the coded input signal; and means for generating an unlocking signal to retract the core of the solenoid if the coded reference and input signals are the same and, if the coded reference and input signals are different, for activating an alarm.

3. A motor vehicle alarm mechanism as claimed in claim 1, further comprising means defining two recesses in communication with said openings and having a depth for accommodating a radial extent of the steering wheel and an area perpendicular to said depth, the area of one of said recesses being the same size as that of one of said openings, and the area of the other of said recesses being larger than the area of said one of said recesses to accommodate steering wheels of different sizes.

4. A motor vehicle alarm mechanism as claimed in claim 3, further comprising a U-shaped plate having therein a U-shaped plate recess which has an area equal to that of said one of said openings, said U-shaped plate being movable within said other of said recesses to cover an exposed area of said other of said recesses after a steering wheel has been inserted therein.

* * * * *